US006157401A

United States Patent [19]

Wiryaman

[11] Patent Number: 6,157,401

[45] Date of Patent: Dec. 5, 2000

[54] END-POINT-INITIATED MULTIPOINT VIDEOCONFERENCING

[75] Inventor: Santo Wiryaman, Lexington, Mass.

[73] Assignee: Ezenia! Inc., Burlington, Mass.

[21] Appl. No.: 09/118,245

[22] Filed: Jul. 17, 1998

[51] Int. Cl.[7] .................................................... H04N 7/14

[52] U.S. Cl. ......................... 348/15; 379/93.24; 370/260

[58] Field of Search ....................... 348/14, 15; 370/260, 370/261; 379/202, 93.24; 709/204

[56] References Cited

U.S. PATENT DOCUMENTS

| | | | |
|---|---|---|---|
| 5,491,797 | 2/1996 | Thompson et al. | 395/200.03 |
| 5,511,168 | 4/1996 | Perlman et al. | 395/200.15 |
| 5,530,472 | 6/1996 | Bregman et al. | 348/15 |
| 6,018,360 | 1/2000 | Stewart et al. | 348/15 |

FOREIGN PATENT DOCUMENTS

| | | |
|---|---|---|
| 8-214272 | 8/1996 | Japan . |
| 10-56513 | 2/1998 | Japan . |
| WO9414265 | 6/1994 | WIPO . |

OTHER PUBLICATIONS

Nyrud, Method For Establishing Multipoint conferences, WO 98/57485, Dec. 1998.

OnLan 323 L2W 323 Gateway/Gatekeeper USER Manual; 1997: Cover Page, Notice, Table of Contents and pp. 74–75.

User Guide: Business Video Conferencing with ProShare Technology; Nov. 1997; Cover Page, Notice and pp. 86–87.

D.H. Crocker: "Standard for the Format of ARPA Internet Text Messages" Standard 13, Aug. 1982 XP002118540, Retrieved from Internet: <URL: http://www.cis.ohio–state, edu/htbin/rfc/rf c822.html> p. 3, paragraph 2.7.

Thom G A: "H. 323: The Multimedia Communications Standard for Local Area Networks" IEEE Communications Magazine, vol. 34, No. 12, Dec. 1, 1996, pp. 52–56, XP000636454 ISSN: 0163–6804, p. 52—p. 54.

*Primary Examiner*—Curtis A. Kuntz
*Assistant Examiner*—Melur Ramakrishnaiah
*Attorney, Agent, or Firm*—Cesari and McKenna, LLP

[57] ABSTRACT

A videoconference gatekeeper (18) inspects the alias-address fields in admission-request messages from video-conference endpoints (12, 14, 16) to determine whether their formats indicate that the alias address should be interpreted as a "compound address" designating separate multipoint-conference participants. If so, it causes a multipoint control unit (20) to allocate conference resources to a videoconference among the participants thereby designated. In a registration-request message that the multipoint control unit (20) immediately sends the gatekeeper, it notifies the gatekeeper of the transport address at which it accords access to the conference resources, and the gatekeeper includes this information in an admission-confirm message that it sends the source of the admission-request message.

29 Claims, 4 Drawing Sheets

END-POINT-INITIATED MULTIPOINT VIDEOCONFERENCING

BACKGROUND OF THE INVENTION

The present invention is directed to videoconferencing and in particular to the way in which a multipoint videoconference is initiated.

Considerable effort has been directed to minimizing the extra capabilities that videoconferencing terminal equipment must be provided. This can be appreciated by considering Recommendation H.323 of the International Telecommunication Union's Telecommunication Standardization Sector.

That recommendation sets forth a standard entitled "Visual Telephone Systems and Equipment for Local Area Networks Which Provide a Non-Guaranteed Quality of Service." Among the methods that it describes are ways to initiate, conduct, and terminate multipoint videoconferences.

The system that H.323 describes for implementing its approach includes terminal, or "endpoint" equipment, such as an appropriately programmed personal computer configured as a network node. Most systems for implementing the H.323 approach also include a gatekeeper. A gatekeeper manages the videoconferencing activities of various endpoints and other equipment within a "zone" of such equipment that has registered with the gatekeeper in accordance with procedures that H.323 sets forth. The gatekeeper's responsibilities vary from implementation to implementation, but they typically include granting videoconference access to the network on the basis of whatever policies the administrator has imposed, allocating network bandwidth among videoconferences, and providing address translation.

Giving the gatekeeper the address-translation task is one way in which system designers minimize endpoint-capability requirements: they thereby relieve the endpoints of the need to keep track of various potential participants' network addresses. To designate a called party, for example, a user may enter an easily remembered alias such as "doe.john@marketing.erie." For actual signal transmission to the other party, though, that alias must be translated into a network address such as "170.242.67.3." Rather than maintaining a translation table, which would ordinarily require frequent updating, the endpoint simply sends a message to the gatekeeper asking for address resolution.

Some capability-minimization efforts are directed particularly to multipoint conferences, i.e., conferences having more than two participants. For a multipoint conference, H.323 requires a "multipoint controller," which coordinates the conference by performing tasks such as mediating the negotiation of communications modes, determining which participants will receive which other participants' outputs, etc. Although H.323 admits of arrangements in which every endpoint's terminal equipment implements a multipoint controller, such an approach tends to be demanding of terminal-equipment resources and is inconvenient from a maintenance standpoint. So systems administrators tend to provide one or more shared multipoint control units that implement the necessary multipoint controllers and to provide multipoint coordination through communications between those units and endpoints not so provisioned.

Another reduction in endpoint-capability requirements results from the way in which the conference's video, audio, and data signals are distributed. When the multipoint controller directs that, say, participant A's output signals are to go to participants B and C, participant A may multicast (or separately unicast) its outputs directly to the other participants. Also, participant A may receive the other participants' signals, and his system may so mix those signals as to enable him to view both other participants simultaneously on his monitor. But this presupposes that participant A's endpoint equipment can keep track of the other participants and perform the necessary multicasting and mixing. Again, requiring all terminal equipment to have such a capability is a heavy resource burden.

So system designers have instead provided the shared multipoint control units with multipoint processors. A multipoint processor acts as an intermediary, distributing each participant's signals to each other participant that is to receive them. Instead of sending its signals to each such other participant, each participant communicates only with the multipoint control unit: from the endpoint terminal's viewpoint, the video, audio, and data transmission are the same as in a two-party video call.

Typically, some external mechanism is used to cause the multipoint control unit to schedule a conference, for which that unit allocates a conference name. At the appointed time, the multipoint control unit calls the participants, or one or more of them call it with a message that includes the conference name, and the conference proceeds for each endpoint as though it were simply a point-to-point call with the multipoint controller. (The conference name is a normal part of point-to-point calls, too.)

Still, if one or both of a point-to-point call's terminal equipment additionally includes a multipoint controller, H.323 provides for expanding a point-to-point conference on an ad hoc basis to a multipoint conference. Presumably, the endpoint process would be arranged to include a capability for communicating conference-invitation requests to the multipoint-controller process, which would then call each new participant.

SUMMARY OF THE INVENTION

We have recognized that a very simple expedient can be used to reduce the endpoint's capability requirements still further. In accordance with our invention, the gatekeeper is configured to interpret a predetermined-format admission-request message as a combination of two or more alias addresses and as a request that it cause the multipoint control unit to set up a conference.

For example, suppose that a user initiates a videoconference in the normal manner but that the alias address he uses is "doe.john@marketing.erie, roe.jane@legal.gary." If the gatekeeper is configured to recognize a comma as indicating a compound alias, it can parse the alias-field contents into the two alias addresses "doe.john@marketing.erie" and "roe.jane@legal.gary," pass those alias addresses and that of the requester to the multipoint control unit as the participants in a conference to be initiated, and place the multipoint control unit's address in the normal admission-confirmation message to the requester. Use of this expedient makes it possible for a user to initiate a multipoint videoconference on an ad hoc basis without adding special multipoint-conference capabilities to the endpoint.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
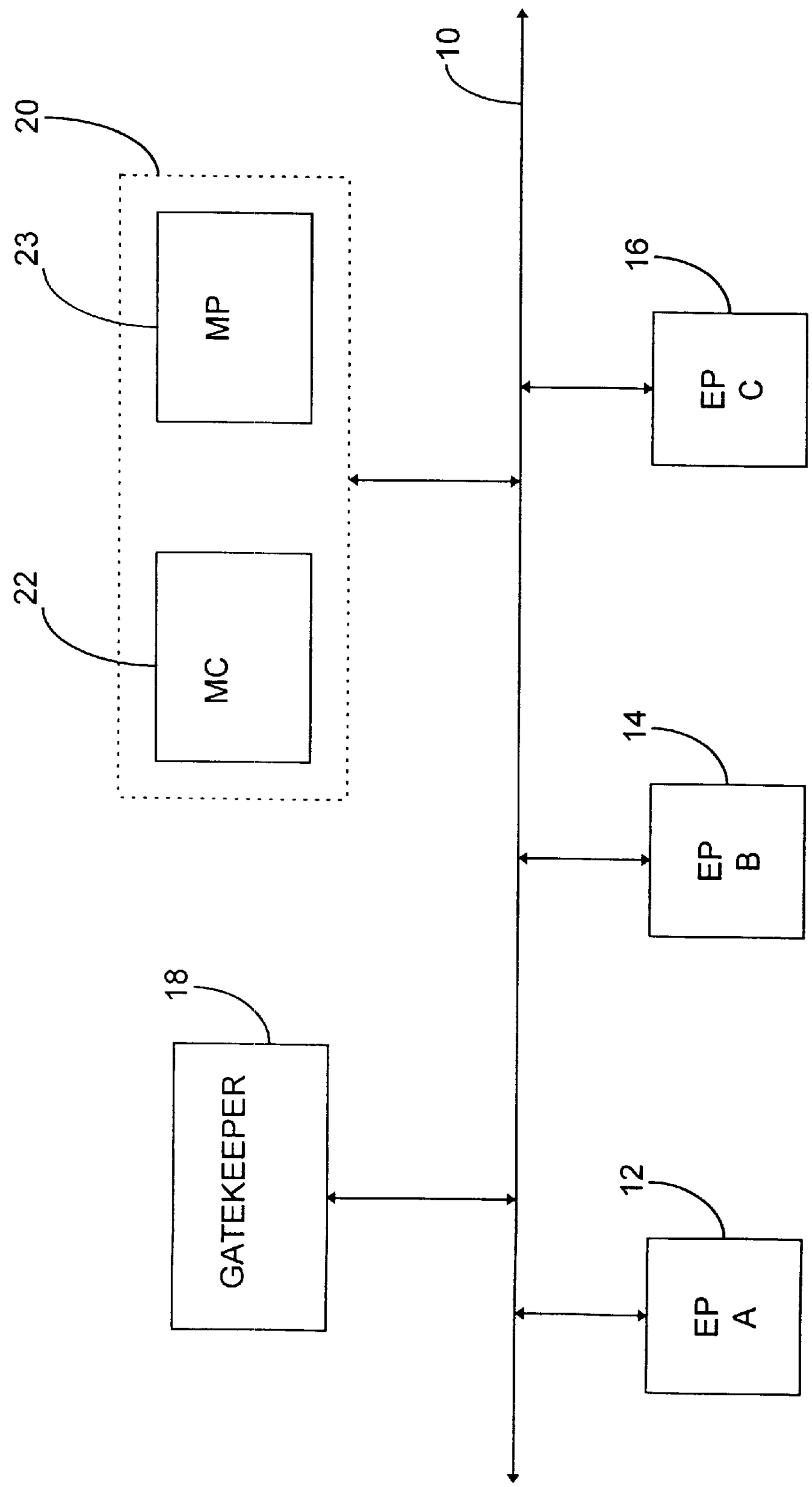
FIG. 1 is a block diagram of a communications system that employs the present invention's teachings.

FIG. 1 depicts a communications network to whose signal media 10 a number of nodes are coupled. Among the nodes are terminals 12, 14, and 16 configured as videoconferencing endpoints to operate in accordance with ITU Recommendation H.323. Although endpoints can be so configured as to conduct videoconferences between them without assistance from other entities, a typical network enabled for videoconferencing will include a gatekeeper 18 to control different conferences' access to the network and thereby allocate network bandwidth.

Figure 2:
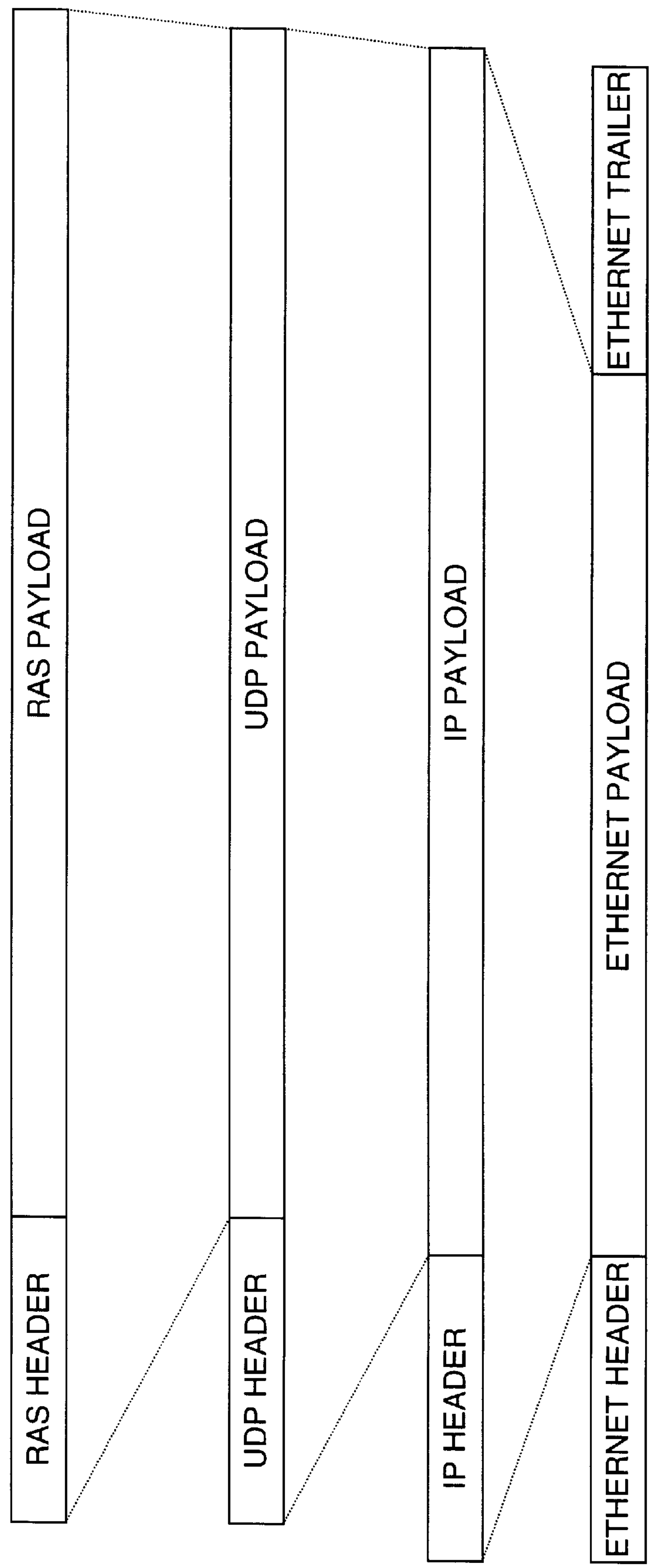
FIG. 2 is a format diagram illustrating a mechanism for conveying a registration, admissions, and status message used in implementing the present invention's teachings.

The communications by which the gatekeeper 18 manages various endpoints' communications occur over a registration, admissions, and status (RAS) channel implemented in messages whose format FIG. 2's first row depicts. The RAS protocol data unit is the payload of an unreliable transport-layer mechanism. In an Internet Protocol (IP) environment, for instance, it would be encapsulated in a User Datagram Protocol (UDP) datagram. As is well known and described in detail in the Internet Community's Requests for Comments ("RFCs") 768 and 1122, a UDP datagram takes the form that FIG. 2's second row depicts.

The UDP datagram's header includes a destination-port field (not separately shown) that specifies a transport-layer port at which the gatekeeper or other entity listens for RAS messages. The UDP datagram is itself the payload of an IP datagram whose format is depicted in FIG. 2's third row and described in more detail in RFCs 791 and 1122. The IP header includes a protocol field that identifies the IP payload as a UDP datagram. FIG. 2's fourth row depicts an Ethernet frame that may be used to encapsulate the IP datagram.

For the sake of simplicity, FIG. 1 depicts the gatekeeper and endpoints as residing on a common local-area-network segment, which FIG. 2 depicts for the sake of concreteness as an Ethernet link that employs the Internet Protocol suite to pass RAS messages. But network routers can route traffic carrying the various messages that this specification describes among videoconferencing entities on different local-area-network segments employing different protocols. Regardless of what other protocols they use, though, the gatekeeper and entities with which it communicates will typically employ the H.225.0 RAS-message format for admissions control.

The RAS header of FIG. 2's first row is a six-bit field that specifies its RAS-message type and thus the format of its payload. Among the RAS-message types is the one that the H 225.0 specification identifies by the mnemonic RRQ (Register Request). An endpoint sends an RRQ message to a gatekeeper to register with it as one of the resources that the gatekeeper is to manage. That message includes various information concerning addresses, identifiers, and so forth that the gatekeeper will need in its subsequent dealings with the registering endpoint.

Figure 3:
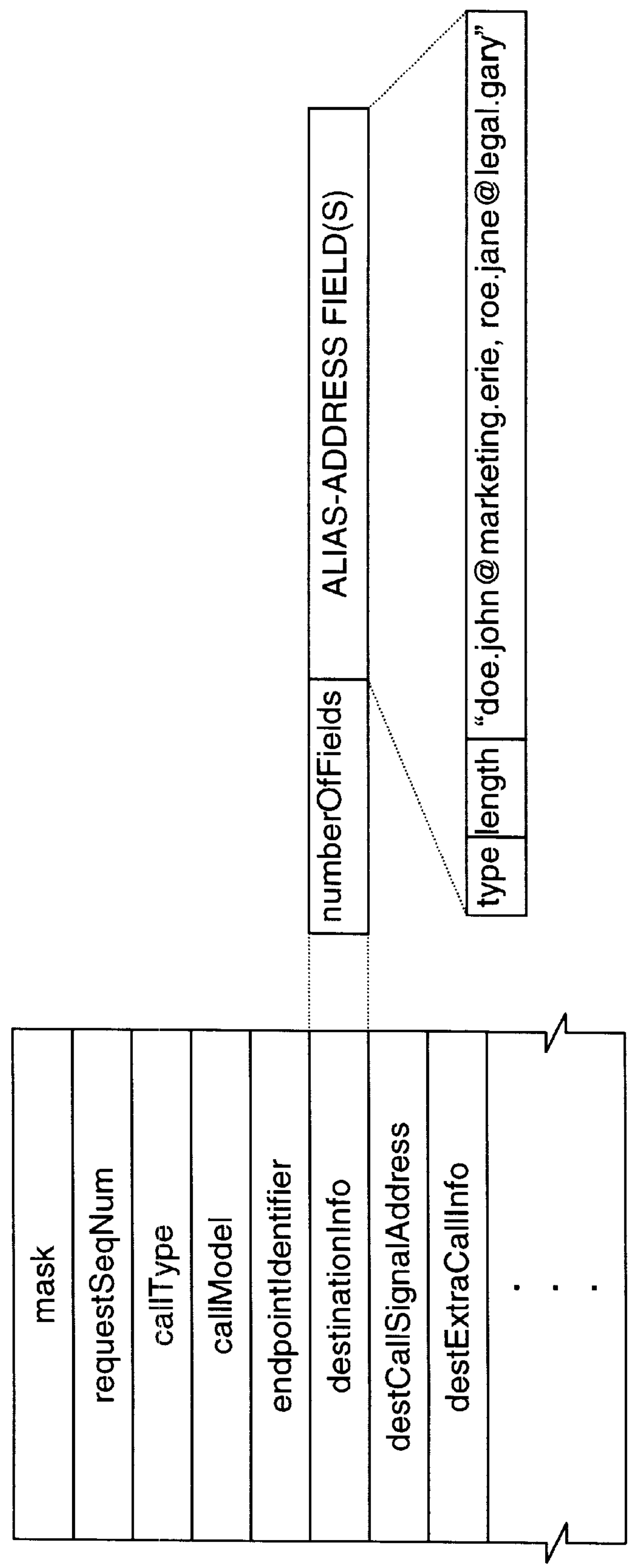
FIG. 3 is a diagram of such a message's payload.

If the gatekeeper is in a position to accept that management task, it stores this information and sends the registering endpoint a RAS message of the RCF (Register ConFirm) type. Or the gatekeeper can reject the assignment by sending an RRJ (Register ReJect) message. If the gatekeeper accepts the task, the endpoint sends it another RAS-protocol message, this one being of the ARQ (Admission ReQuest) type, when the endpoint's user subsequently wants to initiate a videoconference The ARQ message is of particular interest in the present invention's context. FIG. 3 is a conceptual diagram of the ARQ-message payload.

The H.225.0 specification uses Abstract Syntax Notation One ("ASN.1") to define RAS-message payloads, so a RAS speaker ordinarily generates the payload contents by using an ASN.1 encoder that employs ASN.1's packed encoding rules ("PER") to compile desired field values into a bit sequence in accordance with that definition. An ARQ message's payload can omit some fields that the specification provides for such messages, so its first field is a mask, as FIG. 3 indicates, to specify which fields the message includes. Some ARQ messages may therefore omit some of the fields that FIG. 3 lists. Also, FIG. 3 omits some fields that ARQ messages may include.

To avoid obscuring the present invention's salient features, the only field described here is the "destinationInfo" field. That field is of the sequence-of-alias-addresses type: it contains zero or more subfields of the alias-address type. An alias-address-type field's contents may be the name of a party to be called, such as "doe.john@marketing.erie." This is an "alias" because it is not a type of address that the underlying protocols employ to route the communication to the desired node and port. For the communications to occur, a translation to the proper transport address is necessary, and that translation is typically the gatekeeper's responsibility.

In response to the ARQ message, the gatekeeper 18 sends the requesting endpoint a RAS message of the ACF (Admission ConFirm) type to indicate that the requesting endpoint can be allocated enough bandwidth for a videoconference. What else the gatekeeper does depends on the particular network configuration. In some cases, the gatekeeper's further involvement is minimal. Since the gatekeeper will have included in the ACF message's "destCallSignalAddress" field the transport address used for call signaling by the destination endpoint to which the alias address in the requesting endpoint's ARQ message refers, the requesting endpoint can simply transmit call-signaling messages directly to that destination endpoint.

But the gatekeeper and endpoints can instead be configured for the gatekeeper to be more involved. For instance, the gatekeeper may itself send the call-signaling messages to the destination endpoint. Or, if the destination endpoint is not registered with that same gatekeeper, the first gatekeeper may send the signaling messages through another, intermediary gatekeeper, with which the destination endpoint has registered. These are just examples of the many post-admission-grant sequences that Recommendation H.323 sets forth.

The conventional approach to establishing multipoint videoconference access is ostensibly similar to the approach just described for point-to-point-videoconference access. Specifically, the requesting endpoint simply sends an ARQ message that, just as in the point-to-point case, contains a user-entered alias. The only difference is that the user will have entered an alias, such as "WeeklyStaffMeeting," that a multipoint control unit 20's multipoint controller 22 would have used in registering with the gatekeeper 18 after having been operated to schedule a conference. A multipoint control unit provides, among other things, the function of a multipoint controller and, frequently, that of a multipoint processor, as FIG. 1's blocks 22 and 23 indicate.

So when an endpoint includes a given conference's alias in its ARQ message to the gatekeeper 18, the gatekeeper is able to translate that alias to the appropriate transport-level address in the "destCallSignalAddress" field of the ACF message with which it responds to the requesting endpoint. From the participating endpoints' perspectives, the videoconference then proceeds as usual, but they are in actuality communicating to a greater or lesser degree through the multipoint control unit rather than directly with each other.

Although the conventional multipoint-conference procedure for requesting and granting admissions appears quite similar to the procedure for point-to-point conferences, it actually is much less convenient in practice because it presupposes that a conference has already been scheduled and thus does not lend itself to impromptu multipoint videoconferences. Recommendation H.323 does provide for unscheduled, "ad hoc" multipoint conferences, but the procedure that it envisions can be employed only if one or more of the participating-endpoint sites includes a multipoint controller. The present invention avoids this constraint by employing the endpoint's ARQ message not only to establish connections with already-scheduled conferences but also to cause an unscheduled conference to be established. And it can do so in a way that requires no change in endpoint hardware or software.

FIG. 3's expanded view of the destinationInfo field depicts contents of a type that can be used for this purpose. As that drawing shows, the destinationInfo field starts with a numberOfFields subfield. This subfield indicates how many subfields of the alias-address type the destination-address field contains. As will be explained presently, some conventional systems are arranged to send more than one such subfield, but most contain only one. The one or more alias-address subfields follow the numberOfFields subfield. FIG. 3 depicts only one.

As FIG. 3 indicates, each such subfield consists of three segments. The first, type segment indicates the manner in which the alias address's characters will be encoded. A value of $04_{16}$, for instance, represents "BMPString," which indicates that each character's code will be two bytes in length and should be interpreted in accordance with the ISO/IEC 10646-1 (Unicode) specification. The next, length segment tells how many such characters will follow, and the last field contains that many characters.

The destinationInfo field's format is conventional: it requires no special support on the endpoint's part. In accordance with the present invention, though, the gatekeeper determines whether the destinationInfo field contains what we will call a "compound address." If it detects such an address, it causes a multipoint control unit to set up a conference. Preferably, it is the user who provides the indicator of whether there is a compound address; no separate endpoint-equipment support is necessary.

For example, suppose that the indicator is the presence of one or more commas in the alias-address field. To start a multipoint videoconference, the user proceeds just as he does when he starts a normal point-to-point conference, but the alias address that he enters is the appropriately delimited concatenation of the other participants' aliases. An example is FIG. 3's "doe.john@marketing.erie, roe.jane@legal.gary." This approach requires no endpoint-equipment support and only minimal knowledge on the user's part. The gatekeeper notes the comma's presence, interpreting it both as a request for a multipoint conference and as a delimiter that divides the subfield's contents into two endpoint addresses, namely, "doe.john@marketing.erie" and "roe.jane@legal.gary." As will be explained directly, the gatekeeper then initiates a conference in response.

Instead of a single alias-address field divided by delimiter characters, the endpoint equipment could use a destination-Info field containing plurality of alias-address subfields. Conventionally, each alias-address subfield of such a destinationInfo field is often a string representing a party's number on the public switched telephone network, and such a string could be used in implementing the present invention, too. But the contents of the different alias-address subfields conventionally represent different ISDN bearer channels that together will carry the videoconference signals. Another conventional way to represent different bearer channels is to add additional numbers to the destExtraCallInfo field. To implement the present invention, the gatekeeper can instead interpret the plurality of alias-address subfields—or added information in the destExtraCallInfo field—as requesting a multipoint conference among participants respectively represented by those fields' contents. It could so interpret all such destination-information fields (destination-Info and/or destExtraCallInfo fields), or it could do so only when one or more of their subfields additionally include some other indicator of a multipoint-conference request. A benefit of this approach is that the gatekeeper's normal message-parsing routine is what separates the individual addresses. But this approach is not preferred, because it requires that the endpoint "know" that a multipoint conference is being requested.

Figure 4:
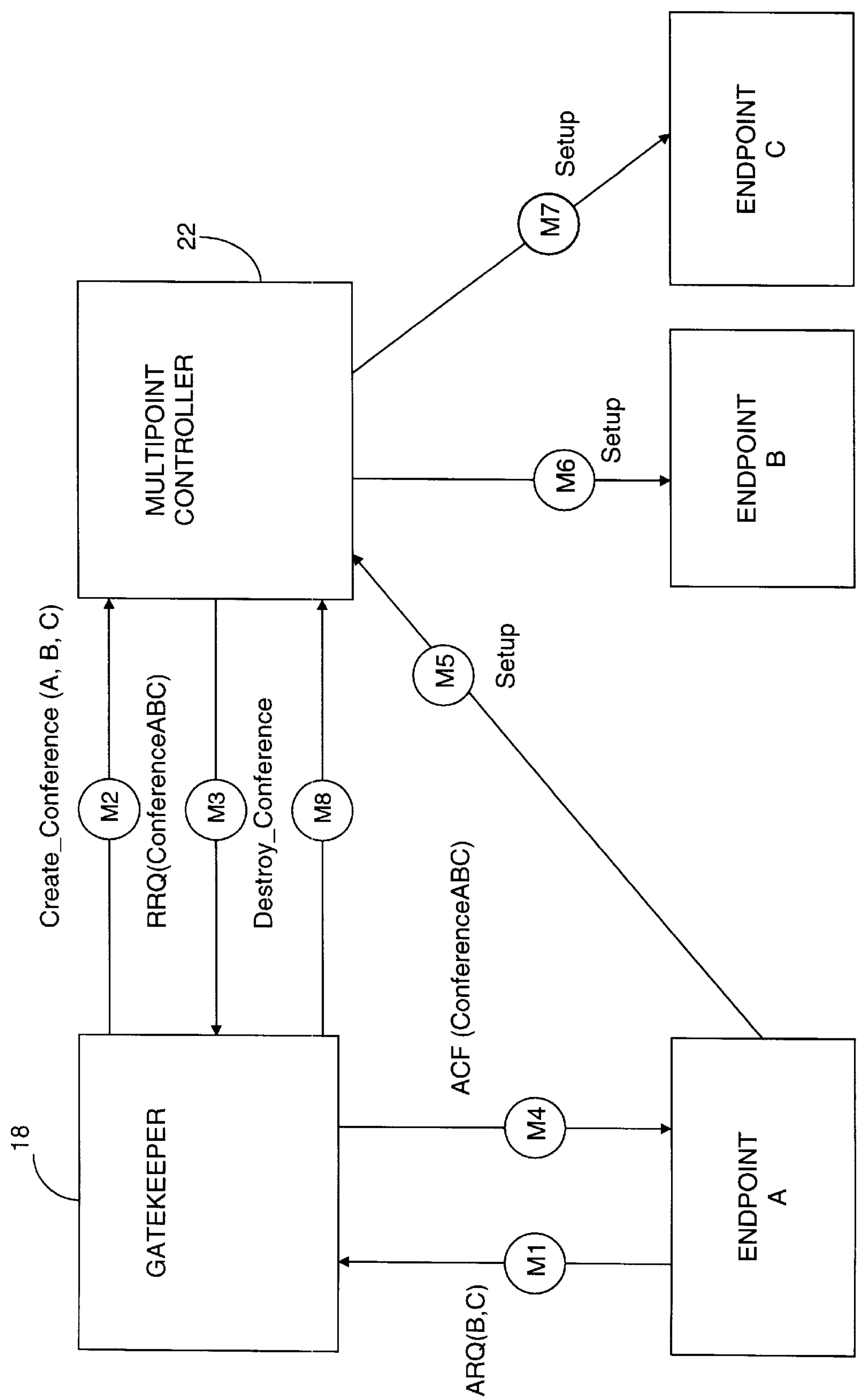
FIG. 4 is a diagram depicting a typical message sequence that can be employed by a system that implements the present invention's teachings.

The manner in which the gatekeeper initiates a multipoint conference will vary from implementation to implementation, but FIG. 4 illustrates a typical message sequence for multipoint-conference initiation. Message M1 represents the compound-address-containing ARQ message from Endpoint A to the gatekeeper. For brevity, we assume that the requesting endpoint's alias is "A" and those of the other endpoints are "B" and "C." The gatekeeper recognizes the message as a conference request, so it calls a "Create_Conference" procedure that the multipoint control unit has been programmed to perform. This procedure call, which the drawing designates as message M2, specifies the conference name as, say, "ABC" and the participating endpoints as "A," "B," and "C." It also specifies the conference type as "unlisted," meaning that its existence is not generally advertised: other endpoints cannot join it by browsing a conference list to get its name. Message M2 also specifies the conference start time as "now" and the conference end time as "never," meaning that the conference will not end at a prearranged time.

The gatekeeper and multipoint control unit may be implemented in the same computer, in which case the call would be a local inter-process communication. More typically, they would be at different sites, and the call would be a remote procedure call or other message-passing mechanism between the gatekeeper and multipoint control unit.

The multipoint control unit responds by allocating resources required to support the conference. Since the conference start time is listed as "now," the multipoint control unit also immediately sends an RRQ-type RAS message M3 to the gatekeeper to register the conference, giving the gatekeeper the port number at which the multipoint control unit will listen for requests to set up conference ABC. In the destCallSignalAddress field of ACF message M4 with which the gatekeeper answers Endpoint A's ARQ message, the gatekeeper passes this information to Endpoint A together with the multipoint control unit's network address.

Endpoint A accordingly uses these addresses in establishing with the multipoint control unit a reliable transport-level session in which, in accordance with standard H.323 procedures, it sends a Q.931 Setup message M5. In the case of the IP protocol suite, for example, this message is passed in the data stream carried by a transport-level session established in accordance with the Transport Control Protocol ("TCP") set forth in RFCs 793 and 1122. Also in accordance with standard procedures, after performing the appropriate admission procedure (i.e., an ARQ/ACF sequence) with the gatekeeper, the multipoint control unit uses setup messages M6 and M7 to call the other named participants into the conference. The videoconference then proceeds in one of the conventional ways.

Typical videoconference-endpoint behavior involves periodically sending the gatekeeper a RAS message of the IRR (InfoRequestResponse) type during its participation in a videoconference and then sending a RAS message of the DRQ (Disengagement-Request) type at the conference's end. The gatekeeper concludes that an endpoint has left the conference if that endpoint sends it a DRQ message or fails to send it an IRR message for more than a predetermined duration. When all participants have left the conference or only one is left, the gatekeeper calls another multipoint-control-unit procedure Destroy_Conference. The multipoint control unit responds to this message M8 by freeing up its resources allocated to that conference.

Although the example set forth above gives one example of the present invention's teachings, the invention can be implemented in many other ways. Of course, the particular supporting link-, network-, and transport-layer protocols can be different without departing from the invention's principles. Indeed, the protocols used by successive segments of the path from one participant to another may differ from one another.

Also, although it is convenient to use a comma both to delimit the addresses and to represent a request for a multipoint conference, other individual characters or character combinations can be used instead, for either or both functions. And, as was explained above, constituent alias addresses do not all need not be placed in a single alias-address field.

So the present invention can be practiced in a wide range of embodiments to initiate impromptu multipoint videoconferences with much less of a endpoint-capability requirement than previous arrangements imposed. It thus constitutes a significant advance in the art.

What is claimed is:

1. A communications network, including signal media and nodes thereon that implement a videoconference multipoint control unit, a videoconference gatekeeper, and a plurality of videoconference endpoints, wherein:

A) the videoconference gatekeeper is so configured as to:
   i) receive, through the signal media from a source endpoint among the videoconference endpoints, an admission-request message that includes at least one alias-address field;
   ii) determine whether the contents of the received admission-request message's at least one alias-address field conforms to a compound-address format predetermined to represent a compound alias address;
   iii) if so, parse the contents of the received admission-request message's at least one alias-address field into a plurality of individual alias addresses representing other participants and send the multipoint control unit a create-conference message that identifies as conference participants the other participants and the source endpoint; and
   iv) in response to a resulting registration-request message containing a conference transport address from the multipoint control unit, sending in an admission-confirmation message to the admission-request message's source the conference transport address contained in the registration-request message; and B) the videoconference multipoint control unit is configured to respond to the create-conference message from the gatekeeper by:
   i) allocating conference resources to a conference among the conference participants that the create-conference message identifies; and
   ii) sending the gatekeeper a registration-request message that identifies a conference transport address at which the multipoint control unit will afford access to the conference resources thus allocated.

2. A communications network as defined in claim 1 wherein:

A) the alias-address field is a subfield of a destination-information field containing only one alias-address field as well as a number-of-fields subfield that indicates that the number of the destination-information field's alias-address fields is only one; and B) the alias address field includes at least one delimiter character at which the gatekeeper performs the parsing of the alias-address field into the plurality of individual alias addresses.

3. A communications network as defined in claim 2 wherein the predetermined compound-address format is the presence of at least one predetermined multipoint-conference-request character in the alias-address field.

4. A communications network as defined in claim 3 wherein the delimiter character is the same as the multipoint-conference-request character.

5. A communications network as defined in claim 4 wherein the delimiter character is a comma.

6. A communications network as defined in claim 3 wherein the delimiter character is a comma.

7. A communications network as defined in claim 2 wherein the delimiter character is a comma.

8. A communications network as defined in claim 1 wherein the predetermined compound-address format is the presence of at least one predetermined multipoint-conference-request character in the alias-address field.

9. A communications network as defined in claim 8 wherein the delimiter character is a comma.

10. A communications network as defined in claim 1 wherein the videoconference multipoint control unit is further configured to respond to a setup message from one participant endpoint to the conference transport address by admitting that one participant to the conference and initiating a call to each of the other participants.

11. For operating a communications network including signal media and nodes thereon that implement a videoconference multipoint control unit, a videoconference gatekeeper, and a plurality of videoconference endpoints, a method comprising the steps of:

A) receiving at the videoconference gatekeeper, through the signal media from a source endpoint among the videoconference endpoints, an admission-request message that includes at least one alias-address field;

B) employing the videoconference gatekeeper to determine whether the contents of the received admission-request message's at least one alias-address field conforms to a compound-address format predetermined to represent a compound alias address;

C) if so, employing the videoconference gatekeeper to parse the contents of the received admission-request message's at least one alias-address field into a plurality of individual alias addresses representing other participants and send the multipoint control unit a create-conference message that identifies as conference participants the other participants and the source endpoint;

D) employing the videoconference multipoint control unit to respond to the create-conference message from the gatekeeper by:

i) allocating conference resources to a conference among the conference participants that the create-conference message identifies; and ii) sending the gatekeeper a registration-request message that identifies a conference transport address at which the multipoint control unit will afford access to the conference resources thus allocated; and E) in response to a resulting registration-request message containing a conference transport address from the multipoint control unit, employing the videoconference gatekeeper to send in an admission-confirmation message to the admission-request message's source the conference transport address contained in the registration-request message.

12. A method as defined in claim 11 wherein:

A) the alias-address field is a subfield of a destination-information field containing only one alias-address field as well as a number-of-fields subfield that indicates that the number of the destination-information field's alias-address fields is only one; and B) the alias address field includes at least one delimiter character at which the gatekeeper performs the parsing of the alias-address field into the plurality of individual alias addresses.

13. A method as defined in claim 12 wherein the predetermined compound-address format is the presence of at least one predetermined multipoint-conference-request character in the alias-address field.

14. A method as defined in claim 13 wherein the delimiter character is the same as the multipoint-conference-request character.

15. A method as defined in claim 14 wherein the delimiter character is a comma.

16. A method as defined in claim 13 wherein the delimiter character is a comma.

17. A method as defined in claim 12 wherein the delimiter character is a comma.

18. A method as defined in claim 11 wherein the predetermined compound-address format is the presence of at least one predetermined multipoint-conference-request character in the alias-address field.

19. A method as defined in claim 18 wherein the delimiter character is a comma.

20. A method as defined in claim 1 further including the stop of employing the videoconference multipoint control unit to respond to a setup message from one participant endpoint to the conference transport address by admitting that one participant to the conference and initiating a call to each of the other participants.

21. For use in a communications network, including signal media and nodes thereon that implement a videoconference multipoint control unit and a plurality of videoconference endpoints, a videoconference gatekeeper so configured as to:

A) receive, through the signal media from a source endpoint among the videoconference endpoints, an admission-request message that includes at least one alias-address field;

B) determine whether the contents of the received admission-request message's at least one alias-address field conforms to a compound-address format predetermined to represent a compound alias address;

C) if so, parse the contents of the received admission-request message's at least one alias-address field into a plurality of individual alias addresses representing other participants and send the multipoint control unit a create-conference message that identifies as conference participants the other participants and the source endpoint; and D) in response to a resulting registration-request message containing a conference transport address from the multipoint control unit, sending in an admission-confirmation message to the admission-request message's source the conference transport address contained in the registration-request message.

22. A videoconference gatekeeper as defined in claim 21 wherein:

A) the alias-address field is a subfield of a destination-information field containing only one alias-address field as well as a number-of-fields subfield that indicates that the number of the destination-information field's alias-address fields is only one; and B) the alias address field includes at least one delimiter character at which the gatekeeper performs the parsing of the alias-address field into the plurality of individual alias addresses.

23. A videoconference gatekeeper as defined in claim 22 wherein the predetermined compound-address format is the presence of at least one predetermined multipoint-conference-request character in the alias-address field.

24. A videoconference gatekeeper as defined in claim 23 wherein the delimiter character is the same as the multipoint-conference-request character.

25. A videoconference gatekeeper as defined in claim 24 wherein the delimiter character is a comma.

26. A videoconference gatekeeper as defined in claim 23 wherein the delimiter character is a comma.

27. A videoconference gatekeeper as defined in claim 22 wherein the delimiter character is a comma.

28. A videoconference gatekeeper as defined in claim 21 wherein the predetermined compound-address format is the presence of at least one predetermined multipoint-conference-request character in the alias-address field.

29. A videoconference gatekeeper as defined in claim 28 wherein the delimiter character is a comma.

* * * * *